United States Patent
Takehara et al.

(10) Patent No.: US 9,986,303 B2
(45) Date of Patent: May 29, 2018

(54) VIDEO IMAGE CODING DATA TRANSMITTER, VIDEO IMAGE CODING DATA TRANSMISSION METHOD, VIDEO IMAGE CODING DATA RECEIVER, AND VIDEO IMAGE CODING DATA TRANSMISSION AND RECEPTION SYSTEM

(71) Applicant: JVC KENWOOD Corporation, Yokohama-shi (JP)

(72) Inventors: Hideki Takehara, Yokohama (JP); Motoharu Ueda, Yokohama (JP)

(73) Assignee: JVC KENWOOD Corporation, Yokohama-shi (JP)

( * ) Notice: Subject to any disclaimer, the term of this patent is extended or adjusted under 35 U.S.C. 154(b) by 157 days.

(21) Appl. No.: 14/657,359

(22) Filed: Mar. 13, 2015

(65) Prior Publication Data
US 2015/0281691 A1    Oct. 1, 2015

(30) Foreign Application Priority Data
Mar. 31, 2014 (JP) .................................. 2014-071975

(51) Int. Cl.
| | |
|---|---|
| *H04N 19/30* | (2014.01) |
| *H04N 21/647* | (2011.01) |
| *H04N 19/33* | (2014.01) |
| *H04N 19/37* | (2014.01) |
| *H04N 21/2343* | (2011.01) |
| *H04N 21/24* | (2011.01) |

(52) U.S. Cl.
CPC ....... *H04N 21/64769* (2013.01); *H04N 19/33* (2014.11); *H04N 19/37* (2014.11); *H04N 21/23439* (2013.01); *H04N 21/234327* (2013.01); *H04N 21/2402* (2013.01); *H04N 19/30* (2014.11)

(58) Field of Classification Search
CPC ........ H04N 19/30; H04N 19/33; H04N 19/37; H04N 21/234327
See application file for complete search history.

(56) References Cited

U.S. PATENT DOCUMENTS 5,886,736 A * 3/1999 Chen ...................... G06T 9/004
348/42
6,292,512 B1 * 9/2001 Radha ................ H04N 21/6377
375/240.1

(Continued)

FOREIGN PATENT DOCUMENTS

| JP | 2005-303925 A | 10/2005 |
| JP | 2008-199677 A | 8/2008 |
| JP | 2010-087827 A | 4/2010 |

*Primary Examiner* — Robert J Hance
(74) *Attorney, Agent, or Firm* — Venable LLP; Michael A. Sartori; Miguel A. Lopez

(57) ABSTRACT

A transmission rate acquisition unit acquires the transmission rate of a network. A predictive transmission structure setting unit sets a transmission structure including a basic hierarchy and a supplementary hierarchy. A first transmission unit transmits basic video image coding data of the basic hierarchy. A memory unit stores supplementary video image coding data of the supplementary hierarchy. A second transmission unit transmits the supplementary video image coding data stored in the memory unit. A transmission control unit controls the second transmission unit according to the transmission rate.

2 Claims, 7 Drawing Sheets

(56) References Cited

U.S. PATENT DOCUMENTS

| | | | | |
|---|---|---|---|---|
| 6,496,980 | B1* | 12/2002 | Tillman | H04N 7/17318 |
| | | | | 348/E7.071 |
| 6,697,426 | B1* | 2/2004 | Van Der Schaar | H04N 19/61 |
| | | | | 375/240.01 |
| 2005/0172232 | A1* | 8/2005 | Wiseman | H04L 41/069 |
| | | | | 715/718 |
| 2006/0013305 | A1* | 1/2006 | Sun | H04N 19/172 |
| | | | | 375/240.12 |
| 2006/0095944 | A1* | 5/2006 | Demircin | H04N 19/172 |
| | | | | 725/81 |
| 2007/0091997 | A1* | 4/2007 | Fogg | H04N 19/56 |
| | | | | 375/240.1 |
| 2008/0144723 | A1* | 6/2008 | Chen | H04N 19/15 |
| | | | | 375/240.26 |
| 2008/0294789 | A1* | 11/2008 | Nassor | H04N 21/23406 |
| | | | | 709/231 |
| 2011/0082945 | A1* | 4/2011 | Myers | H04N 21/234327 |
| | | | | 709/231 |

* cited by examiner

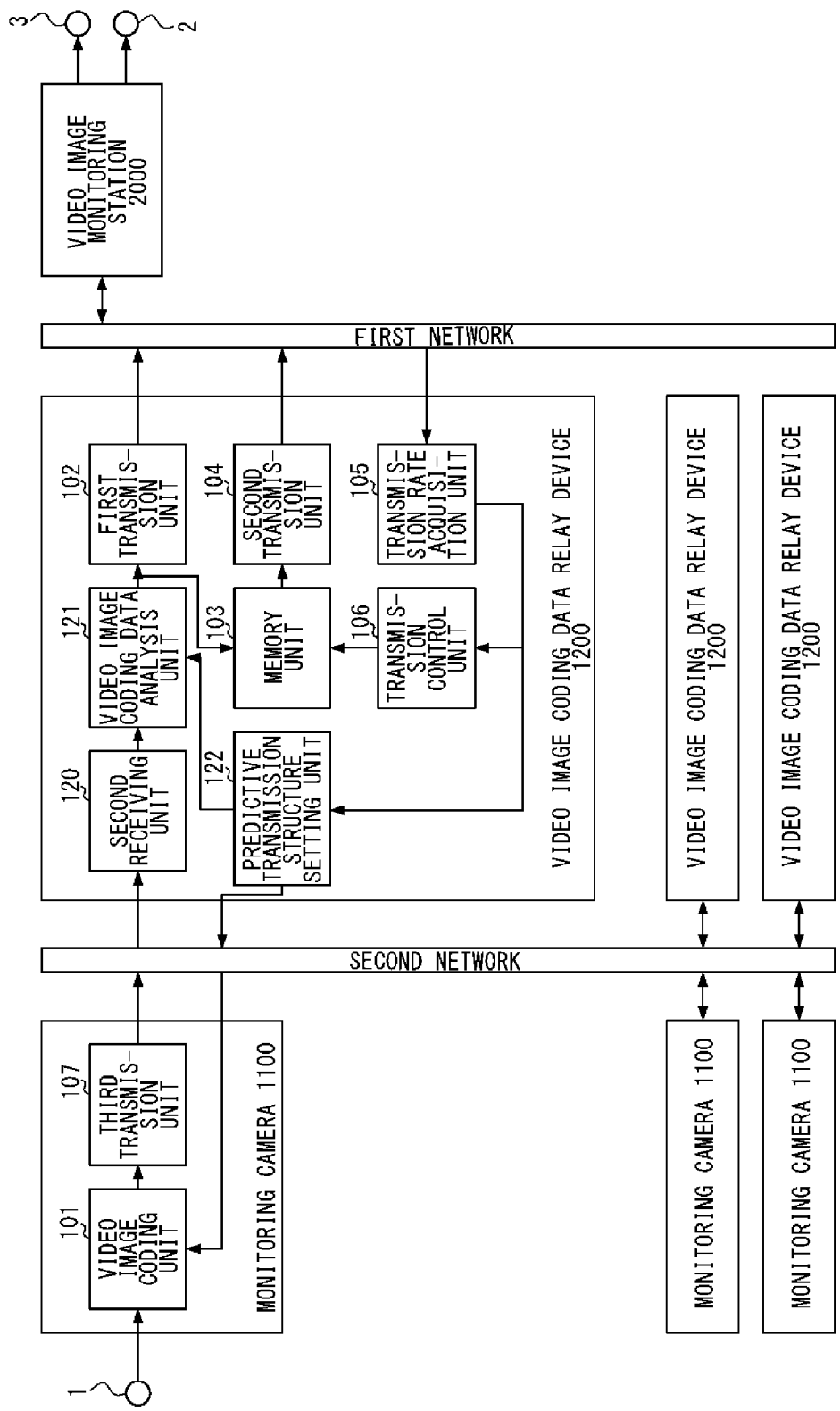

VIDEO IMAGE CODING DATA TRANSMITTER, VIDEO IMAGE CODING DATA TRANSMISSION METHOD, VIDEO IMAGE CODING DATA RECEIVER, AND VIDEO IMAGE CODING DATA TRANSMISSION AND RECEPTION SYSTEM

INCORPORATION BY REFERENCE

The disclosure of Japanese Patent Application No. 2014-071975 filed on Mar. 31, 2014 including the specification, drawings and abstract is incorporated herein by reference in its entirety.

BACKGROUND

1. Field of the Invention

The present invention relates to a video image coding data transmission technology and, more particularly, to a video image coding data transmission technology for transmitting video image coding data in real time.

2. Description of the Related Art

In recent years, services for compression-coding content such as video images, sounds, and the like and transmitting compression-coded content in real time through a network have been growing with the improvement of the performance of mobile terminals such as smartphones and the like, the extension of a network band due to the introduction of LTE and the like, and the progress of a video image compression coding technology such as HEVC and the like.

In a network such as the Internet (IP network), best-effort type transmission is performed, and a band is not guaranteed. Therefore, a transmission rate changes depending on the number of users, the location of use, and the like. Further, in a wireless network, the network can be temporarily disconnected.

Therefore, TCP, which provides quality assurance such as retransmission control, is used in non-real time data transmission. However, quality assurance involving retransmission control is accompanied with delay and is thus not suitable for real-time data transmission. UDP, which does not provide quality assurance, is used in real-time data transmission. Conventional technologies for transmitting video images in real time are disclosed in, for example, Patent document No. 1 and Patent document No. 2.

[Patent document No. 1] Japanese Patent Application Publication No. 2005-303925

[Patent document No. 2] Japanese Patent Application Publication No. 2008-199677

However, a method described in Patent document No. 1 represents a technology where data selected by thinning selection is transmitted in real time and unselected data that has not been transmitted is then transmitted. Thus, a problem with this is that real-time video image transmission and viewing of high-quality video images cannot be achieved at the same time. Also, in a method described in Patent document No. 2, a single video image is duplicated for highly-compressed video image data and low-compressed video image data and transmitted. Thus, a decrease in transmission efficiency becomes a problem.

SUMMARY

In this background, a purpose of the present invention is to provide a video image transmission technology capable of achieving real-time video image transmission and viewing of high-quality video images at the same time.

A video image coding data transmitter according to one embodiment of the present invention includes: a transmission rate acquisition unit that acquires the transmission rate of a network; a transmission structure setting unit that sets a transmission structure including a basic hierarchy and a supplementary hierarchy; a first transmission unit that transmits basic video image coding data of the basic hierarchy; a memory unit that stores supplementary video image coding data of the supplementary hierarchy; a second transmission unit that transmits the supplementary video image coding data stored in the memory unit; and a transmission control unit that controls the second transmission unit according to the transmission rate.

Another embodiment of the present invention relates to a video image coding data receiver. The video image coding data receiver includes: a first receiving unit that receives basic video image coding data; a video image decoding unit that decodes the received basic video image coding data so as to reproduce a video image; a second receiving unit that receives supplementary video image coding data including a supplementary hierarchical picture whose coding order and display order are earlier than those of a basic hierarchical picture included in the basic video image coding data; a basic video image coding data acquisition unit that acquires basic video image coding data received before supplementary video image coding data that has been received at the moment; and a video image coding data reconstruction unit that reconstructs video image coding data from the basic video image coding data acquired by the basic video image coding data acquisition unit and the supplementary video image coding data received by the second receiving unit.

Yet another embodiment of the present invention relates to a video image coding data transmission method. This method includes: acquiring the transmission rate of a network; setting a transmission structure including a basic hierarchy and a supplementary hierarchy; transmitting basic video image coding data of the basic hierarchy; storing supplementary video image coding data of the supplementary hierarchy; transmitting the stored supplementary video image coding data; and controlling the transmission according to the transmission rate.

Optional combinations of the aforementioned constituting elements and implementations of the invention in the form of methods, apparatuses, systems, recording mediums, and computer programs may also be practiced as additional modes of the present invention.

BRIEF DESCRIPTION OF THE DRAWINGS

Embodiments will now be described, by way of example only, with reference to the accompanying drawings that are meant to be exemplary, not limiting, and wherein like elements are numbered alike in several figures, in which:

FIG. 4 is a diagram explaining an example of a relationship among the setting of a prediction structure and a transmission structure, basic video image coding data, and supplementary video image coding data;

FIG. 5 is a diagram explaining an example of a transmission instruction in the example shown in FIG. 4;

FIG. 7 is a diagram explaining a video image coding data transmission and reception system according to a fourth embodiment.

DETAILED DESCRIPTION

Figure 1:
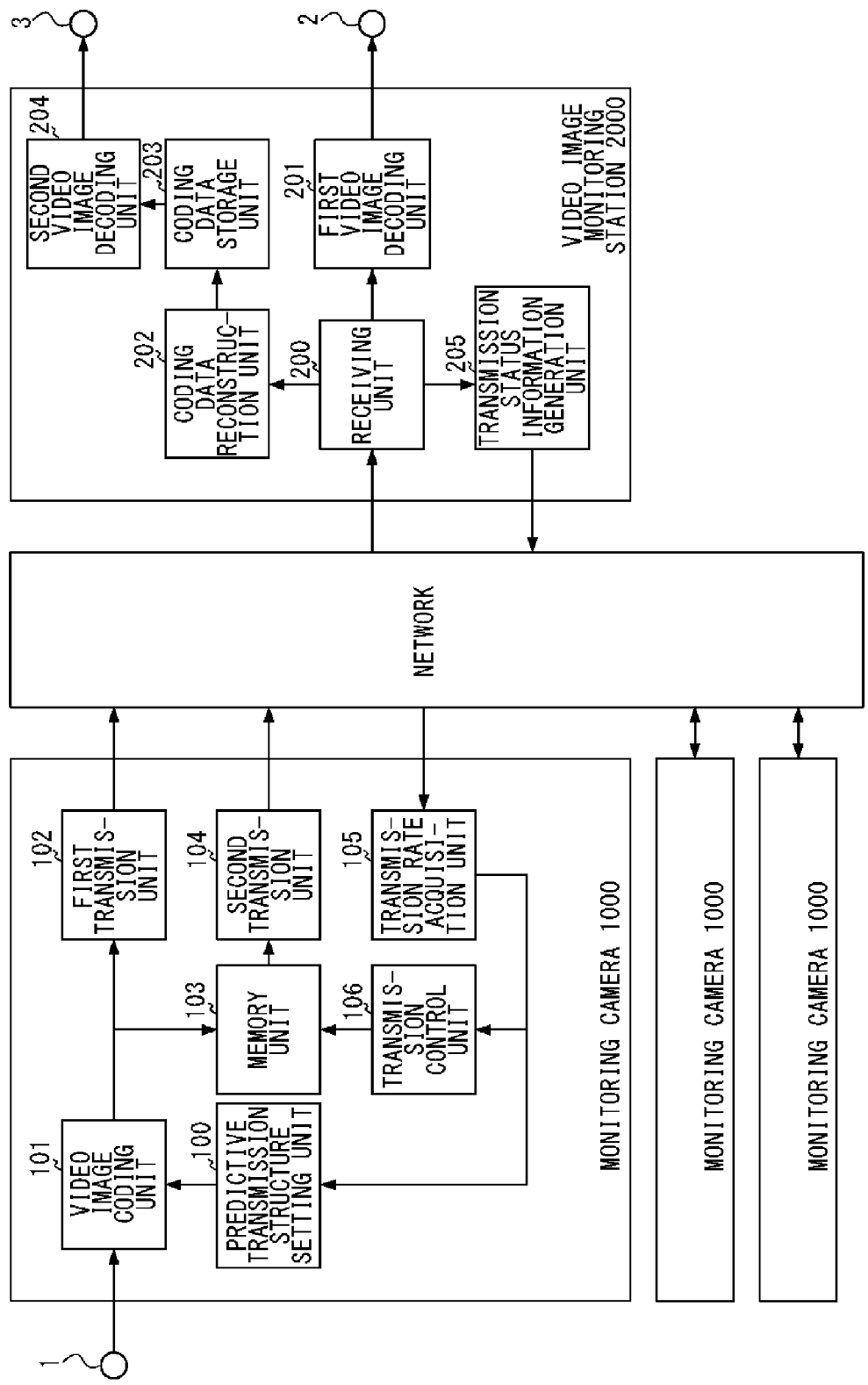
FIG. 1 is a diagram explaining a video image coding data transmission and reception system according to a first embodiment.

The invention will now be described by reference to the preferred embodiments. This does not intend to limit the scope of the present invention, but to exemplify the invention.

An explanation will be given hereinafter, along with figures, regarding the details of a video image coding data transmission technology according to a preferred embodiment of the present invention. In the explanations of the figures, the same elements shall be denoted by the same reference numerals, and duplicative explanations will be omitted.

First Embodiment

FIG. 1 is a diagram explaining a video image coding data transmission and reception system according to a first embodiment. In FIG. 1, three monitoring cameras 1000 are connected to a video image monitoring station 2000 via a network (as an example, the Internet). The monitoring cameras 1000 are each an example of a "video image coding data transmitter," and the video image monitoring station 2000 is an example of a "video image coding data receiver." A video image captured by the monitoring cameras 1000 is monitored by the video image monitoring station 2000 in real time.

(Configuration of Monitoring Camera 1000 and Configuration of Video Image Monitoring Station 2000)

An explanation will be first given regarding the configuration of a monitoring camera 1000. A monitoring camera 1000 is provided with a predictive transmission structure setting unit 100, a video image coding unit 101, a first transmission unit 102, a memory unit 103, a second transmission unit 104, a transmission rate acquisition unit 105, and a transmission control unit 106.

The transmission rate acquisition unit 105 acquires the transmission rate of a network and provides the acquired transmission rate to the transmission control unit 106 and the predictive transmission structure setting unit 100. The transmission rate acquisition unit 105 may receive information on the transmission rate via the network from a transmission status information generation unit 205 of the video image monitoring station 2000 described later or may estimate the transmission rate of the network.

The predictive transmission structure setting unit 100 sets the transmission structure of a video image based on the transmission rate provided from the transmission rate acquisition unit 105 and also sets a prediction structure that indicates a reference relationship of each picture of the video image. The transmission structure of the video image includes a basic hierarchy and a supplementary hierarchy. A basic hierarchy is a hierarchy for transmitting an overview video image, and a supplementary hierarchy is a hierarchy for transmitting an extension video image.

In this embodiment, the predictive transmission structure setting unit 100 sets the ratio of the basic hierarchy and the supplementary hierarchy according to the transmission rate. Alternatively, the predictive transmission structure setting unit 100 may set the ratio of the basic hierarchy and the supplementary hierarchy to be a default value or a designated value regardless of the transmission rate.

Based on the transmission structure and the prediction structure set by the predictive transmission structure setting unit 100, the video image coding unit 101 codes a video image that is input from a terminal 1 and generates basic video image coding data that corresponds to the basic hierarchy and supplementary video image coding data that corresponds to the supplementary hierarchy. The video image coding unit 101 provides the basic video image coding data to the first transmission unit 102 and stores the supplementary video image coding data in the memory unit 103.

The first transmission unit 102 transmits the basic video image coding data provided from the video image coding unit 101 to the video image monitoring station 2000 via the network.

Based on the transmission rate provided from the transmission rate acquisition unit 105, the transmission control unit 106 controls the transmission of the supplementary video image coding data stored in the memory unit 103. When the transmission control unit 106 issues an instruction for transmitting the supplementary video image coding data based on the transmission rate, the second transmission unit 104 reads out the supplementary video image coding data stored in the memory unit 103 and transmits the supplementary video image coding data to the video image monitoring station 2000 via the network.

Note that a supplementary hierarchical picture included in the supplementary video image coding data transmitted by the second transmission unit 104 has a coding order and a display order that precede those of a basic hierarchical picture included in the basic video image coding data transmitted in real time by the first transmission unit 102. In other words, the second transmission unit 104 belatedly transmits supplementary video image coding data of the past when there is a margin in the transmission rate.

An explanation will be now given regarding the configuration of the video image monitoring station 2000. The video image monitoring station 2000 is provided with a receiving unit 200, a first video image decoding unit 201, a coding data reconstruction unit 202, a coding data storage unit 203, a second video image decoding unit 204, and a transmission status information generation unit 205.

The receiving unit 200 receives the basic video image coding data transmitted from the first transmission unit 102 and receives the supplementary video image coding data transmitted from the second transmission unit 104. Note that, while the basic video image coding data is basic video image coding data coded and transmitted in real time by the video image coding unit 101 of the monitoring camera 1000, the supplementary video image coding data is belatedly-transmitted video image coding data of the past stored in the memory unit 103 of the monitoring camera 1000. In other words, the supplementary hierarchical picture included in the supplementary video image coding data transmitted from the second transmission unit 104 has a coding order and a display order that precede those of the basic hierarchical picture included in the basic video image coding data transmitted in real time from the first transmission unit 102.

The transmission status information generation unit 205 obtains the transmission status of the network based on the video image coding data received by the receiving unit 200, generates transmission status information such as a transmission rate, an error incidence rate, and the like, and transmits the transmission status information to the monitoring camera 1000 via the network.

The receiving unit 200 provides the received basic video image coding data to the first video image decoding unit 201 and stores the received basic video image coding data in a memory of the coding data reconstruction unit 202. The receiving unit 200 provides the received supplementary video image coding data to the coding data reconstruction unit 202.

The first video image decoding unit 201 decodes the basic video image coding data provided from the receiving unit 200 and outputs the decoded basic video image coding data to a terminal 2. An overview video image with a low frame rate is output in real time from the terminal 2.

The coding data reconstruction unit 202 rearranges the order of pictures between the basic video image coding data of the past stored in the memory and the supplementary video image coding data received by the receiving unit 200 so as to reconstruct video image coding data and stores the reconstructed video image coding data in the coding data storage unit 203. Note that, since the supplementary hierarchical picture included in the supplementary video image coding data transmitted from the second transmission unit 104 has a coding order and a display order that precede those of the basic hierarchical picture included in the basic video image coding data transmitted in real time from the first transmission unit 102 as described previously, the video image coding data cannot be reconstructed in combination with the supplementary video image coding data if the basic video image coding data of the past is not stored in the memory. The coding data reconstruction unit 202 deletes the basic video image coding data of the past from the memory after the video image coding data is reconstructed.

The second video image decoding unit 204 reads out and decodes the reconstructed video image coding data from the coding data storage unit 203 and outputs the decoded video image coding data to a terminal 3. An extension video image with a high frame rate is output in non-real time from the terminal 3.

The monitoring camera 1000 and the video image monitoring station 2000 are realized by the cooperation of hardware and software in an information processing device or the like provided with a CPU (Central Processing Unit), a frame memory, a hard disk, and the like. By the operation of the above constituting elements, the monitoring camera 1000 and the video image monitoring station 2000 achieve functional constituting elements explained in the following.

(Overview of Operation of Monitoring Camera 1000)

Figure 2:
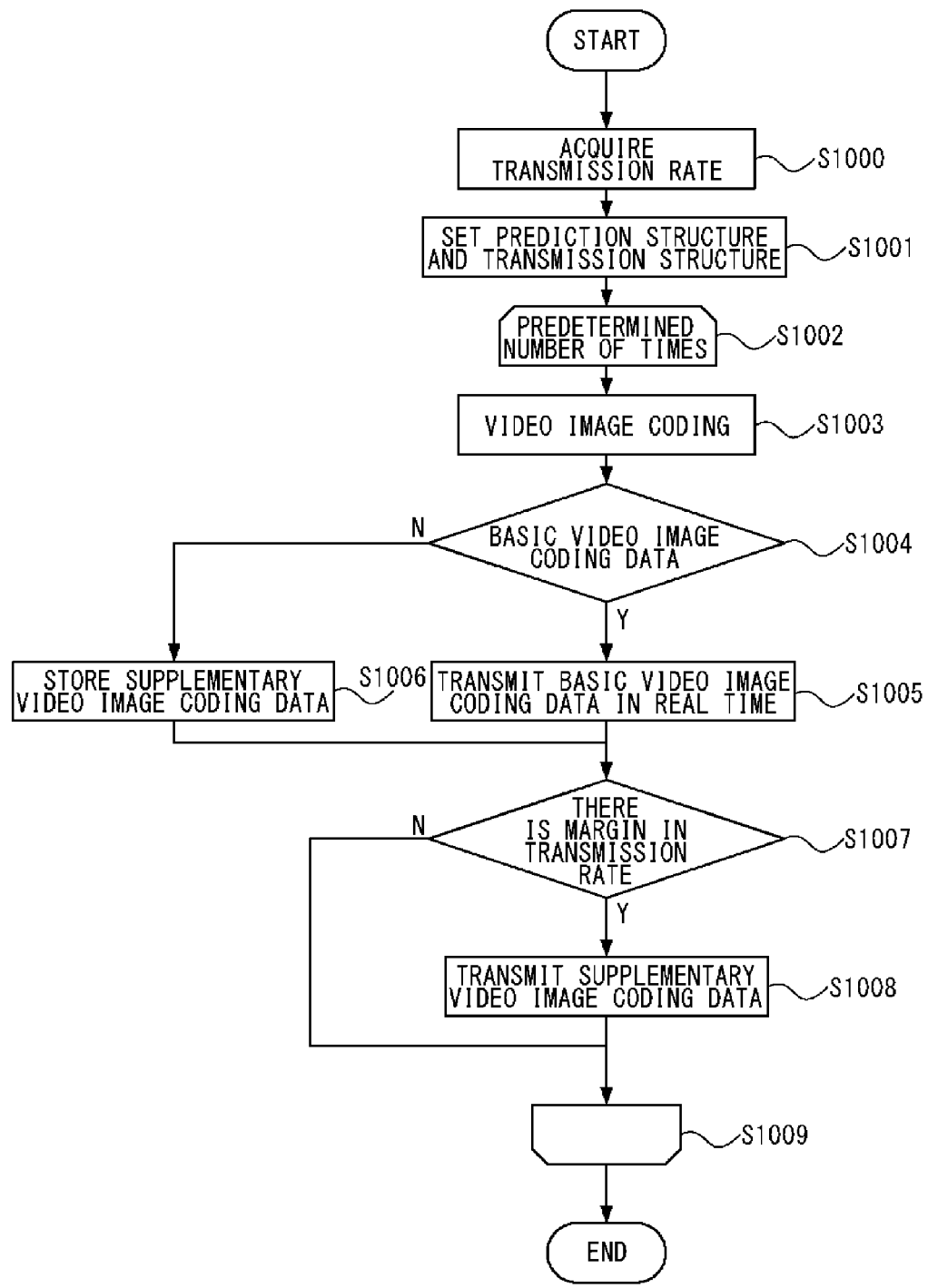
FIG. 2 is a flowchart explaining a procedure of coding and transmitting a video image by a monitoring camera shown in FIG. 1.

An explanation will now be given regarding the overview of the operation of a monitoring camera 1000. FIG. 2 is a flowchart explaining a procedure of coding and transmitting a video image by a monitoring camera 1000. An explanation will be given in the following regarding the operation of the monitoring camera 1000 based on FIG. 2.

The transmission rate acquisition unit 105 acquires the transmission rate of the network from the transmission status information generation unit 205 via the network (S1000). The acquired transmission rate is provided to the predictive transmission structure setting unit 100 and the transmission control unit 106. In this case, the transmission rate acquisition unit 105 acquires the transmission rate of the network from the transmission status information generation unit 205 via the network. Alternatively, the transmission rate acquisition unit 105 may monitor the network and estimate the transmission rate.

The predictive transmission structure setting unit 100 sets a prediction structure and a transmission structure based on the transmission rate provided by the transmission rate acquisition unit 105 (S1001). The prediction structure and the transmission structure that are set are provided to the video image coding unit 101. The setting of the prediction structure and the transmission structure is performed for a predetermined number of pictures. An explanation will be given on the condition that the predetermined number is 10. The predetermined number is simply required to be an arbitrary positive integer such as 15, 30, 60, or the like. Loop processing is performed for the predetermined number of times for steps S1002 through S1009. The bit rate of the video image coding data may be set depending on the transmission rate provided by the transmission rate acquisition unit 105.

The video image coding unit 101 codes a video image that is input from the terminal 1 into video image coding data based on the prediction structure and the transmission structure that are set by the predictive transmission structure setting unit 100 (S1003). In this case, the video image coding unit 101 codes a video image based on HEVC, which is the international standard. Alternatively, the video image coding unit 101 may code a video image based on MPEG-4AVC/H. 264 (hereinafter, AVC) or the like. The video image coding data is sorted into basic video image coding data and supplementary video image coding data based on the transmission structure. A description will be made later regarding a relationship among the setting of the prediction structure and the transmission structure, the basic video image coding data, and the supplementary video image coding data.

The video image coding unit 101 checks whether the video image coding data is basic video image coding data (S1004). If the transmission structure of the video image indicates that the video image coding data is basic video image coding data (Y in S1004), the video image coding data is provided to the first transmission unit 102 as basic video image coding data, and the first transmission unit 102 transmits the basic video image coding data provided by the video image coding unit 101 to the network in real time (S1005). At this time, UDP is used as a transport layer of the Internet, and a port number PA is assigned as a port.

If the transmission structure of the video image indicates that the video image coding data is supplementary video image coding data (N in S1004), the video image coding data is provided to the memory unit 103 as supplementary video image coding data, and the memory unit 103 stores the supplementary video image coding data provided by the video image coding unit 101 (S1006).

The memory unit 103 checks whether a transmission instruction provided from the transmission control unit 106 is ON (S1007). If the transmission instruction is ON (Y in S1007), the memory unit 103 provides supplementary video image coding data to the second transmission unit 104 in the order stored if there is supplementary video image coding data that is stored, and the second transmission unit 104 transmits the supplementary video image coding data provided by the memory unit 103 to the network (S1008). Supplementary video image coding data that is transmitted from the network is deleted from the memory unit 103. At this time, UDP is used as the transport layer of the Internet, and a port number PB is assigned as a port. The transmission control unit 106 provides a transmission instruction when there is a margin in a transmission rate provided by the transmission rate acquisition unit 105. A description will be made later regarding conditions and the details of the transmission instruction when there is a margin in the transmission rate. If the transmission instruction is not ON (N in S1007), the step proceeds to the step S1009 without the transmission of the supplementary video image coding data.

In order to match the transmission of the supplementary video image coding data to the network with the timing of the setting of the transmission rate, the steps S1007 and S1008 may be performed after the step S1009.

The operation explained above is repeatedly performed during a predetermined transmission rate period. Therefore, changes in the transmission rate can be addressed for each predetermined transmission rate period.

(Overview of Operation of Video Image Monitoring Station 2000)

Figure 3:
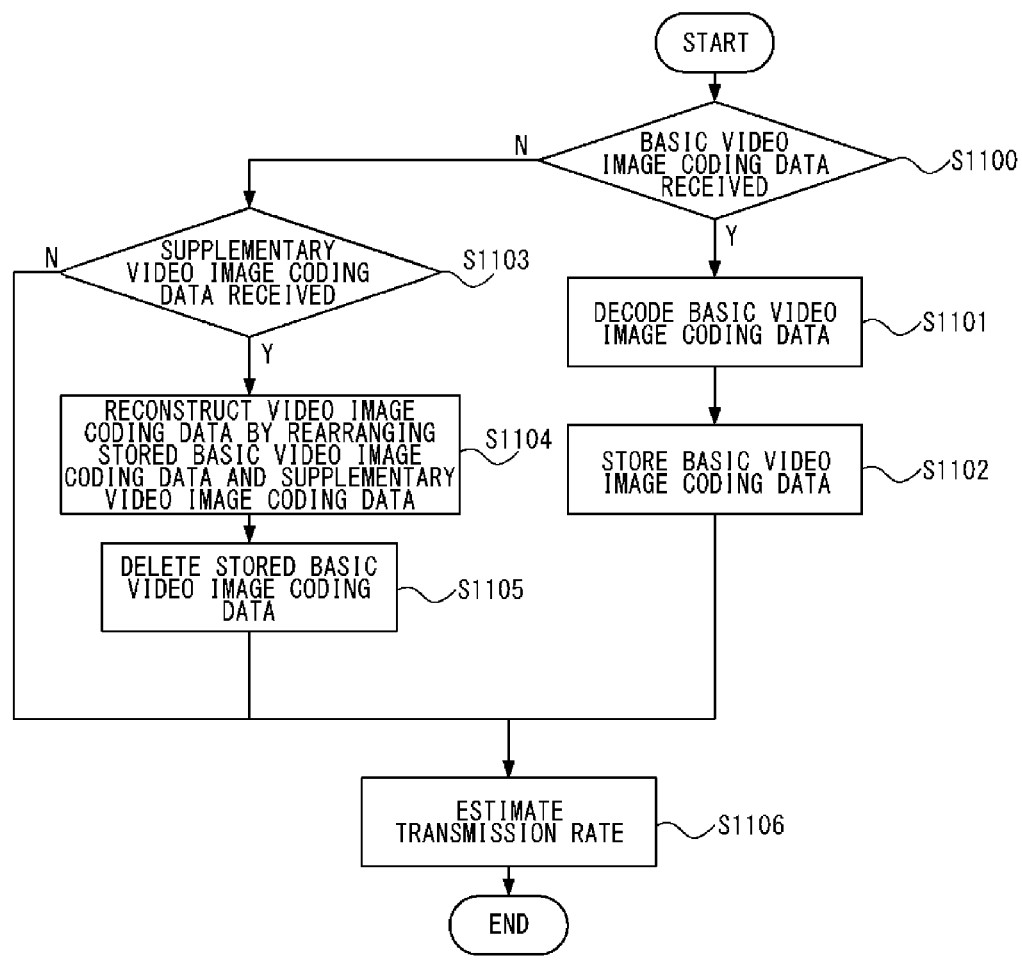
FIG. 3 is a diagram explaining a procedure of receiving and decoding video image coding data by a video image monitoring station shown in FIG. 1.

An explanation will now be given regarding the overview of the operation of a video image monitoring station 2000. FIG. 3 is a diagram explaining a procedure of receiving and decoding video image coding data by a video image monitoring station 2000. An explanation will be given in the following regarding the operation of the video image monitoring station 2000 based on FIG. 3.

If video image coding data the receiving unit 200 receives from the network is basic video image coding data that is received at a port PA (Y in S1100), the receiving unit 200 provides the basic video image coding data to the first video image decoding unit 201 and the coding data reconstruction unit 202. The first video image decoding unit 201 decodes the basic video image coding data provided from the receiving unit 200 so as to generate a reproduction video image and outputs the reproduction video image from the terminal 2 (S1101). Meanwhile, the coding data reconstruction unit 202 stores the basic video image coding data provided from the receiving unit 200 in a memory inside the coding data reconstruction unit 202 (S1102). Alternatively, the coding data reconstruction unit 202 may store the basic video image coding data in an external memory. In short, the coding data reconstruction unit 202 is simply required to be able to acquire basic video image coding data received before supplementary video image coding data that has been received at the moment. The step then proceeds to step S1106. Details of the step S1106 will be described later.

If the video image coding data the receiving unit 200 receives from the network is not basic video image coding data that is input at the port PA (N in S1100) and there is supplementary video image coding data that is received at a port PB (Y in S1103), the receiving unit 200 provides the supplementary video image coding data to the coding data reconstruction unit 202. The coding data reconstruction unit 202 reconstructs video image coding data by rearranging the basic video image coding data stored in the memory in the step S1102 and the supplementary video image coding data received in the step S1103 (S1104). The reconstructed video image coding data is provided to the coding data storage unit 203. Subsequently, the coding data reconstruction unit 202 deletes the basic video image coding data stored in the memory from the memory inside the coding data reconstruction unit 202 (S1105). The step then proceeds to the step S1106. Details of the step S1106 will be described later.

If the video image coding data the receiving unit 200 receives from the network is not the basic video image coding data that is input at the port PA (N in S1100) and there is no supplementary video image coding data that is received at a port PB (N in S1103), the step proceeds to the step S1106.

In this case, the rearrangement of the basic video image coding data and the supplementary video image coding data is performed based on a frame number showing the coding order of pictures that is defined in AVC. Alternatively, a sequence number may be coded in an area different from that of the video image coding data such as a UDP extended area. Also, the reconstructed video image coding data may be packetized in a fixed-length size just like an MPEG-2 transport stream, multiplexed with sound data or the like, and stored as a media stream. Alternatively, the reconstructed video image coding data may be packetized in units of access units just like an MP4 file, multiplexed with sound data or the like, and stored as a media stream. Further, while storing the basic video image coding data and the supplementary video image coding data in the order received without rearranging the basic video image coding data and the supplementary video image coding data, a picture reproduction order list based on the frame number showing the coding order of pictures can also be generated and stored. In this case, reproduction based on the picture reproduction order list allows the video image coding data to be properly reproduced without any rearrangement.

The transmission status information generation unit 205 analyzes the status of receiving the basic video image coding data and the supplementary video image coding data of the receiving unit 200 and estimates the transmission rate of the network (S1106). It is assumed that the method of estimating the transmission rate is a general method where estimation is performed by measuring round trip time. The estimated transmission rate is provided to the transmission rate acquisition unit 105 of the monitoring camera 1000. The estimated transmission rate is assumed to be coded in a UDP extended area.

A bitstream stored in the coding data storage unit 203 is provided to the second video image decoding unit 204 as necessary and decoded by the second video image decoding unit 204 so as to generate a reproduction video image, and the reproduction video image is output from the terminal 3.

As described, a reproduction video image with a high frame rate is output in non-real time from the terminal 3 while a reproduction video image with a low frame rate is output in real time from the terminal 2.

(Event Basis Operation of Video Image Monitoring Station 2000)

An explanation will be now given regarding an event basis operation of the video image monitoring station 2000. An event basis operation is performed by the operation by a user. For example, the event basis operation is used when the user wishes to see a video image with a higher frame rate. In this case, the second video image decoding unit 204 decodes the video image coding data provided from the coding data reconstruction unit 202 so as to generate a reproduction video image and outputs the reproduced video image from the terminal 3. The video image coding data output from the coding data storage unit 203 may be stored in a file or the like at this time.

(Setting of Prediction Structure and Transmission Structure, Basic Video Image Coding Data, and Supplementary Video Image Coding Data)

Figure 4:
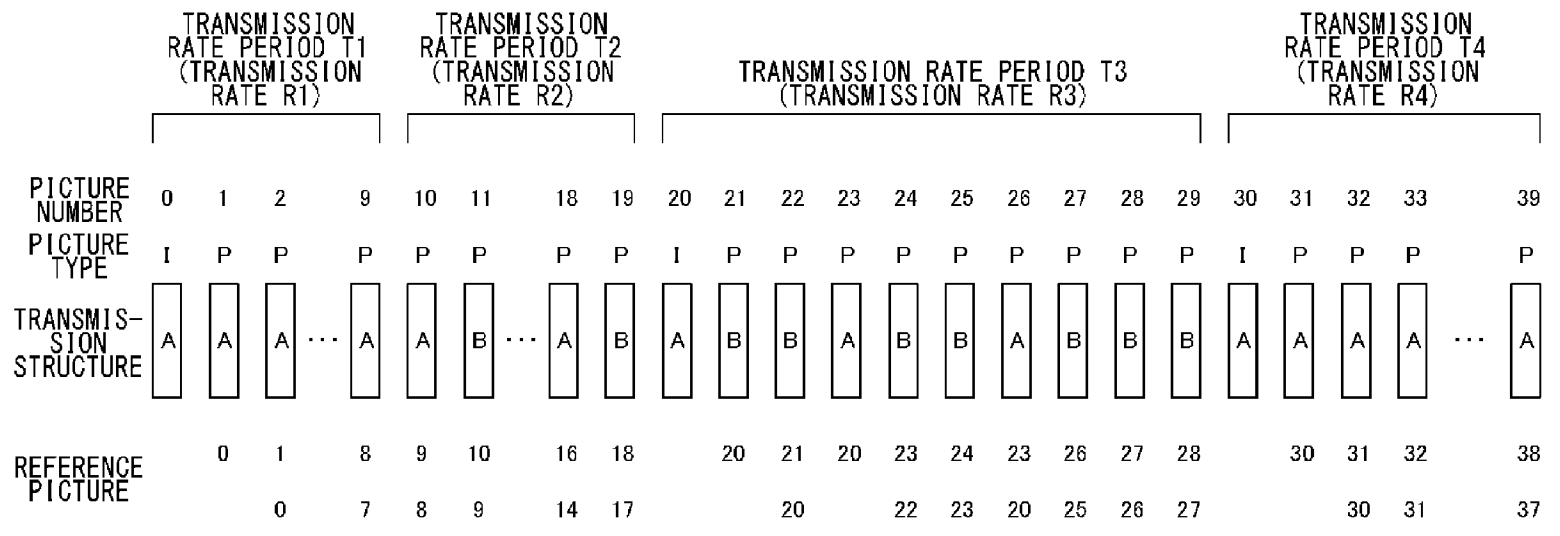

Next, in reference to FIG. 4, an explanation will be given regarding an example of a relationship among the setting of a prediction structure and a transmission structure, basic video image coding data, and supplementary video image coding data.

A transmission rate period is a period when a transmission rate acquired by the transmission rate acquisition unit 105 is effective. It is assumed that the transmission rate that has once acquired does not change during the transmission rate period. One transmission rate period is set to include ten pictures. There are four transmission rate periods: T1, T2, T3, and T4, and respective transmission rates of the transmission rates periods are R1, R2, R3, and R4. In an example shown in FIG. 4, R1 is 4 Mbps, R2 is 2 Mbps, R3 is 800 kbps, and R4 is 6 Mbps.

In order to facilitate the explanation, an explanation will be given herein on the assumption that a transmission rate period is the same as a period during which a prediction structure and a transmission structure are set (in which the number of pictures for which the same prediction and transmission structures are applied). However, since a transmission rate period and a period for setting prediction and transmission structures are independent concepts, these periods may be set separately.

A picture number is assigned to each picture that constitutes a video image that is input from the terminal 1. Picture types include an I picture for performing intra coding, a P picture for performing inter prediction coding, and a B picture for performing inter prediction coding in a bidirectional manner. In order to simplify the explanation, an I picture and a P picture are used herein for the explanation. However, instead of a P picture, a B picture may be used as a picture type.

There are two types of transmission structures: a basic hierarchical picture (A) and a supplementary hierarchical picture (B). A basic hierarchical picture is provided to the first transmission unit 102 as basic video image coding data, and a supplementary hierarchical picture is provided to the memory unit 103 as supplementary video image coding data. A reference picture is a picture used for inter prediction, and a reference relationship among pictures is referred to as a prediction structure. The maximum number of reference pictures is set to be two in this case.

All pictures are coded as basic hierarchical pictures in the transmission rate period T1 and the transmission rate period T4. Pictures are coded alternately as basic hierarchical pictures and as supplementary hierarchical pictures in the transmission rate period T2. Pictures are coded alternately as basic hierarchical pictures and as supplementary hierarchical pictures in the ratio of 1:2 or 1:3, respectively, in the transmission rate period T3. The ratio of basic hierarchical pictures and supplementary hierarchical pictures has been explained to be up to 1:3 thus far. However, the ratio of basic hierarchical pictures and supplementary hierarchical pictures can be set to be 1:30, 2:1, etc.

As described, the proportion of basic hierarchies to supplementary hierarchies can be changed in accordance with the transmission rate. When the transmission rate is sufficiently high (there is a margin), all basic hierarchies in the transmission rate are coded as basic hierarchical pictures. As the transmission rate becomes lowered (there is less margin), supplementary hierarchical pictures are increased, and the ratio of basic hierarchical pictures is reduced.

A basic hierarchical picture refers to two immediately preceding basic hierarchical pictures at this time. Also, a supplementary hierarchical picture refers to two immediately preceding basic hierarchical pictures and/or supplementary hierarchical pictures. As described, limiting basic hierarchical pictures to refer to only basic hierarchical pictures allows for decoding in the presence of only basic video image coding data. Meanwhile, allowing supplementary hierarchical pictures to refer to both basic hierarchical pictures and supplementary hierarchical pictures increases the coding efficiency.

As an example for setting a transmission structure according to a transmission rate, all pictures are coded as basic hierarchical pictures when the transmission rate is 4 Mbps or higher, basic hierarchical pictures and supplementary hierarchical pictures are alternately coded when the transmission rate is 1 Mbps or higher and less than 4 Mbps, and basic hierarchical pictures and supplementary hierarchical pictures are coded at a proportion of 1:2 or 1:3 when the transmission rate is less than 1 Mbps. A minimum transmission rate at which all pictures are coded as basic hierarchical pictures is referred to as a reference transmission rate. In the example, 4 Mbps is the reference transmission rate. A case where there is a margin in the transmission rate means a case where the transmission rate is larger than the reference transmission rate.

As described above, by acquiring a transmission rate for a predetermined transmission rate period and by setting the proportion of basic hierarchical pictures to supplementary hierarchical pictures such that the ratio of the basic hierarchical pictures is increased as the transmission rate becomes larger and the ratio of the supplementary hierarchical pictures is increased as the transmission rate becomes smaller, the basic hierarchical pictures can be transmitted in real time even when the transmission rate is small.

Further, by transmitting supplementary hierarchical pictures along with basic hierarchical pictures during a transmission rate period in which there is a margin in a transmission rate and by reconstructing video image coding data from the basic hierarchical pictures and the supplementary hierarchical pictures on the receiving side, the viewing of a video image at a low frame rate can be achieved in real time before the supplementary hierarchical pictures are received, and the viewing of a video image at a high frame rate can be achieved after the supplementary hierarchical pictures are received. Since no duplicate picture is transmitted in the basic hierarchical pictures and the supplementary hierarchical pictures, the transmission efficiency is not lowered.

In the above, basic hierarchical coding data and supplementary hierarchical coding data are transmitted by different ports of UDP. However, as long as the basic hierarchical coding data and the supplementary hierarchical coding data can be distinguished from each other in the video image monitoring station 2000, the method is not limited to this. For example, the basic hierarchical coding data and the supplementary hierarchical coding data may be respectively assigned with different identifiers, multiplexed in a MP4 file or MPEG-2TS, and transmitted by a single port. In this case, the identifiers may be provided in the video image coding data or may be provided at the time of multiplexing.

In the above, a transmission rate period and/or a period for setting prediction and transmission structures are explained as fixed periods. However, these periods may be variable periods. For example, when the transmission rate is smaller than a predetermined threshold value or when the number of supplementary hierarchical pictures stored in the memory unit 103 is larger than the predetermined threshold value, the transmission rate period and/or the period for setting the prediction and transmission structures may be controlled to be shorter. When the transmission rate is smaller than the predetermined threshold value and the number of the supplementary hierarchical pictures stored in the memory unit 103 is larger than the predetermined threshold value, the transmission rate period and/or the period for setting the prediction and transmission structures may be controlled to be shorter.

When the transmission rate is large enough, the transmission rate period and/or the period for setting the prediction and transmission structures may be set to be long, and coding may be continued for a while on the assumption that the transmission rate will not change for a while. However, when the transmission rate is small, it is desired, considering the possibility of a change in the transmission rate, to set the transmission rate period and/or the period for setting the prediction and transmission structures to be short, to acquire the latest transmission rate, and to update the transmission structure frequently. When the number of supplementary hierarchical pictures stored in the memory unit 103 is large, buffer overflow is more likely to occur. Thus, it is desired to set the transmission rate period and/or the period for setting the prediction and transmission structures to be short, to acquire the latest transmission rate, and to change the transmission structure. By setting the transmission rate period and/or the period for setting the prediction and transmission structures to be variable periods as described above, the transmission of the supplementary hierarchical pictures can be properly performed while appropriately updating the transmission rate or appropriately changing the transmission structure.

Also, a simpler structure can be employed where basic hierarchical pictures and supplementary hierarchical pictures are set to be I pictures and P pictures, respectively, and an interval between I pictures can be adjusted in accordance with the transmission rate for the purpose of improving the quality of a video image. For example, an interval between I pictures is controlled such that the interval between I pictures is set to be shorter as the transmission rate becomes higher and that the interval between I pictures is set to be longer as the transmission rate becomes lower. In this manner, basic hierarchical pictures can be transmitted in real time even when a transmission rate is small with a simpler structure, and supplementary hierarchical pictures can be also transmitted in a transmission rate period where there is a margin in a transmission rate.

(Example of Transmission Instruction)

Figure 5:
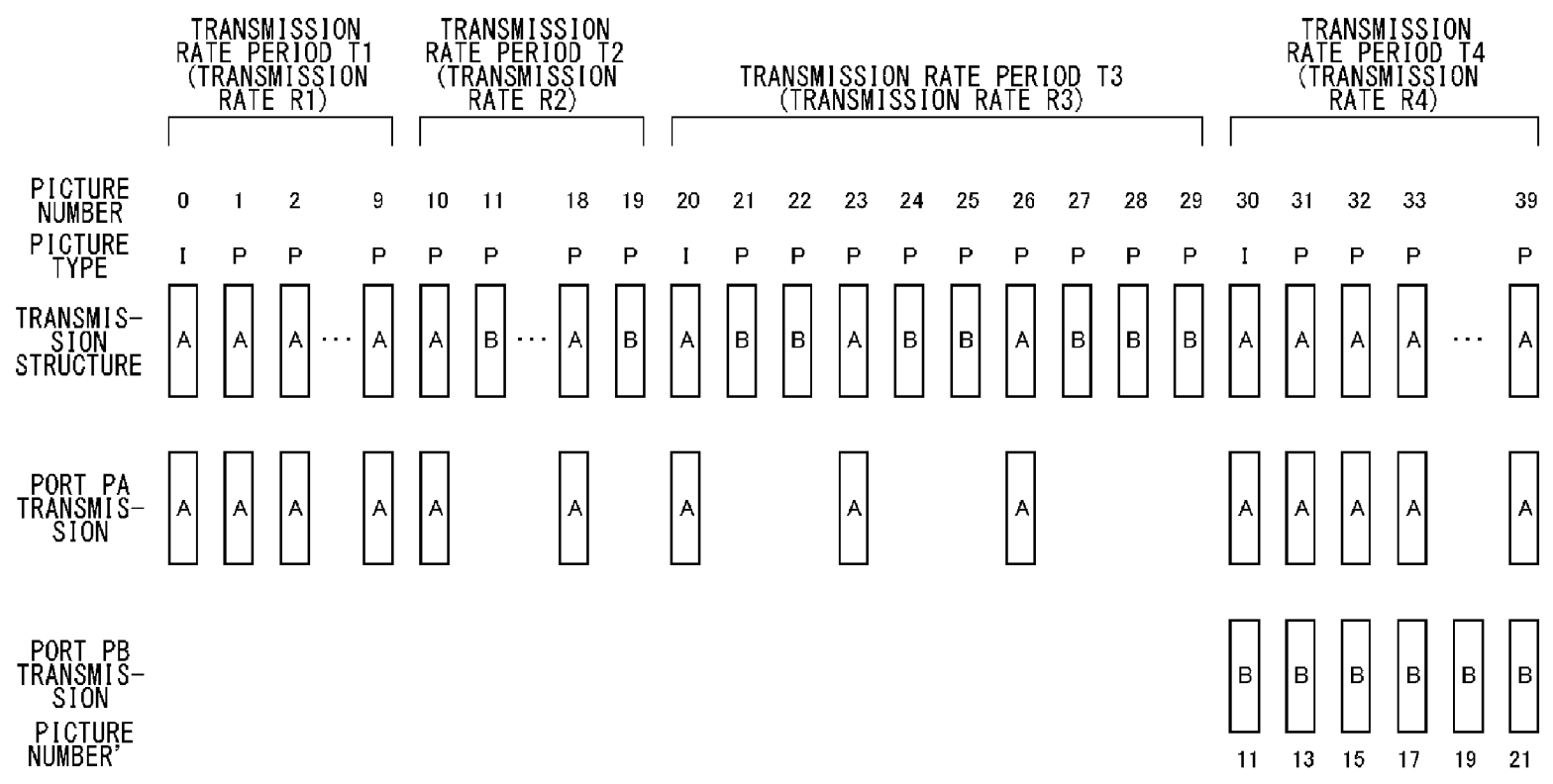

An explanation will now be given of an example of a transmission instruction with reference to FIG. 5. An explanation will be given herein regarding the example of the transmission instruction using, as an example, the relationship among the setting of a prediction structure and a transmission structure, basic video image coding data, and supplementary video image coding data shown in FIG. 4. The same as in FIG. 4 applies to a picture number, a picture type, and a transmission structure. "Port PA transmission" indicates basic hierarchical pictures transmitted from the port PA, and "Port PB transmission" indicates supplementary hierarchical pictures transmitted from the port PB. Picture number' indicates respective picture numbers of the supplementary hierarchical pictures transmitted from the port PB. In the same way as in FIG. 4, R1 is 4 Mbps, R2 is 2 Mbps, R3 is 800 kbps, and R4 is 6 Mbps for transmission rates.

The basic hierarchical pictures are transmitted in real time from the port PA. When there is a margin in the transmission rate (in a case where the transmission rate is R4), the supplementary hierarchical pictures are transmitted from the port PB in the order stored without exceeding the transmission rate. FIG. 5 shows a state where pictures 11, 13, 15, 17, 19, and 21 out of pictures 11, 13, 15, 17, 19, 21, 22, 24, 25, 27, 28, and 29, which are the supplementary hierarchical pictures stored in the memory unit 103, are being transmitted in a transmission rate period T4. As described, supplementary hierarchical pictures having coding order and display order that are earlier than those of basic hierarchical pictures transmitted in a given transmission interval are transmitted.

The coding data reconstruction unit 202 rearranges the order of basic hierarchical pictures of the past stored in the memory and the supplementary hierarchical pictures received in the transmission rate period T4 and performs reconstruction.

This allows, after supplementary hierarchical pictures are received, video image coding data to be reconstructed from basic hierarchical pictures stored in the memory and the received supplementary hierarchical pictures and a video image consisting of all pictures to be viewed, while viewing basic hierarchical pictures in real time.

For example, in a crime prevention system, it is effective to use a video image with a high frame rate as an evidence video image including a decisive moment after an event while monitoring a video image with a low frame rate in real time. In mobile communication where a plurality of transmission paths are available such as 3G/LTE, WiFi, and the like, by reducing a transmission quantity by transmitting only basic hierarchical pictures in a 3G/LTE area having a band limitation and transmitting supplementary hierarchical pictures in a WiFi area having no band limitation, an overview video image can be reproduced even in an environment with a band limitation, and a video image with a high frame rate can be reproduced in an environment with no band limitation.

[Exemplary Variation of First Embodiment]

An explanation will be given in the following regarding differences in an exemplary variation of the first embodiment from the first embodiment. The exemplary variation is different from the first embodiment in the setting of a transmission structure. In the first embodiment, basic video image coding data and supplementary video image coding data are set in units of pictures. In the exemplary variation, basic video image coding data (basic hierarchical GOP) and supplementary video image coding data (supplementary hierarchical GOP) are set in units of GOPs.

Regarding the basic hierarchical GOP, the basic hierarchical GOP is set to be an open GOP if the immediately preceding GOP is a basic hierarchical GOP, and the basic hierarchical GOP is set to be a closed GOP if the immediately preceding GOP is a supplementary hierarchical GOP. In a closed GOP, coding and decoding can be performed with reference to pictures in the GOP. On the other hand, a supplementary hierarchical GOP is always set to be an open GOP. As described, setting a basic hierarchical GOP to be an open GOP only when the immediately preceding GOP is a basic hierarchical GOP allows for decoding in the presence of only a basic hierarchical GOP. Meanwhile, allowing a supplementary hierarchical GOP to be always set to be an open GOP increases the coding efficiency.

By employing a GOP, which is a unit that is larger than a picture, for the setting of a transmission structure, a clock that synthesizes basic video image coding data and supplementary video image coding data of the coding data reconstruction unit 202 in the video image monitoring station 2000 can be reduced. Obviously, a transmission structure can be also set in units of a plurality of GOPs.

Second Embodiment

Figure 6:
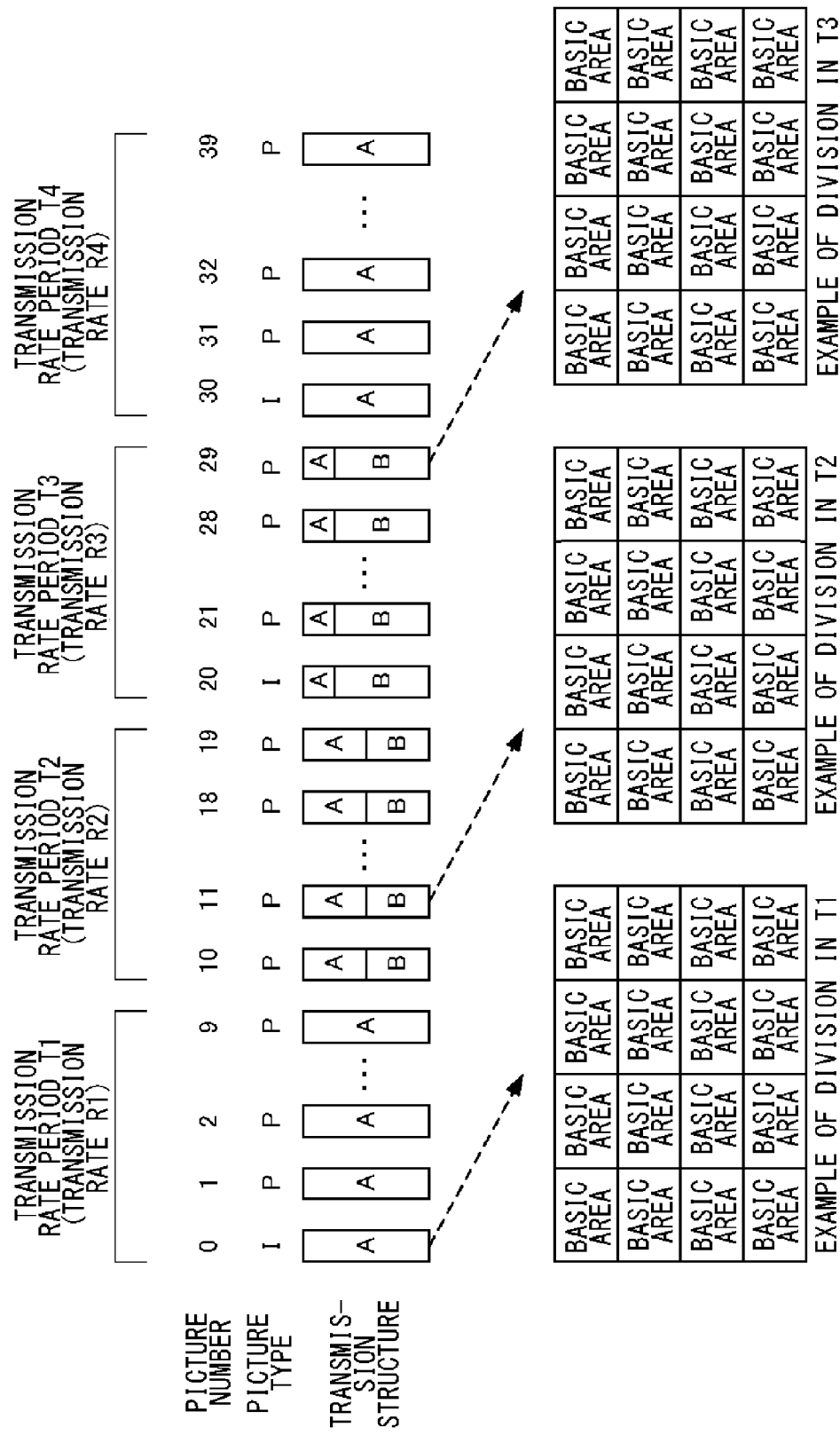
FIG. 6 is a diagram explaining an example of a relationship among the setting of a prediction structure and a transmission structure, basic video image coding data, and supplementary video image coding data according to a second embodiment.

An explanation will be given in the following regarding a second embodiment. An explanation will be given mainly of differences from the first embodiment. FIG. 6 is a diagram explaining an example of a relationship among the setting of a prediction structure and a transmission structure, basic video image coding data, and supplementary video image coding data according to a second embodiment. As shown in FIG. 6, the second embodiment is different from the first embodiment in that a transmission structure is divided in a picture in the second embodiment.

There are two types of transmission structures: a basic hierarchy area (A) and a supplementary hierarchy area (B). A basic hierarchy area is coded into basic video image coding data and provided to the first transmission unit 102, and a supplementary hierarchy area is coded into supplementary video image coding data and provided to the memory unit 103.

An explanation will be first given regarding the monitoring camera 1000. The predictive transmission structure setting unit 100 sets a prediction structure and a transmission structure based on the transmission rate provided by the transmission rate acquisition unit 105 (S1001). An explanation will now be given regarding the setting of a transmission structure according to the second embodiment. A picture is divided in quarters in each of horizontal and vertical directions, forming 16 divided areas. A basic hierarchy area and a supplementary hierarchy area are set for each of the divided areas.

All divided areas are set to be basic hierarchy areas in a transmission rate period T1 (transmission rate R1) and a transmission rate period T4 (transmission rate R4). In a transmission rate period T2 (transmission rate R2), divided areas in the second and third lines are set to be basic hierarchy areas, and divided areas in the first and fourth lines are set to be supplementary hierarchy areas. In a transmission rate period T3 (transmission rate R3), four divided areas in the center of the picture are set to be basic hierarchy areas, and divided areas other than the basic hierarchy areas are set to be supplementary hierarchy areas.

The video image coding unit 101 divides into areas a video image that is input from the terminal 1 based on a transmission structure that is set and codes divided areas into basic hierarchical coding data or supplementary hierarchical coding data in units of tiles (may be slices) (S1003).

A basic hierarchy area refers to respective basic hierarchy areas of two immediately preceding pictures at this time. A supplementary hierarchy area refers to respective basic hierarchy areas and supplementary hierarchy areas of the two immediately preceding pictures. By determining a reference relationship as described, an accurate video image can be decoded for a basic hierarchy area from basic hierarchy areas only without depending on supplementary hierarchy areas.

In the above, basic hierarchy areas and supplementary hierarchy areas are set as shown in FIG. 6. However, as long as these areas can be set such that the basic hierarchy areas become larger (the number of areas divided as basic hierarchy areas becomes larger) as a transmission rate becomes larger and that the basic hierarchy areas become smaller (the number of areas divided as basic hierarchy areas becomes smaller) as the transmission rate becomes smaller, the way of setting the areas is not limited to this. For example, by enlarging a feature area as the transmission rate becomes larger in combination with a feature area extraction process, the feature area can be adaptively transmitted in accordance with the transmission rate.

An explanation will be now given regarding the video image monitoring station 2000. In the video image monitoring station 2000, a method for reconstructing video image coding data is different. In this case, the rearrangement of the basic video image coding data and the supplementary video image coding data is performed based on a macroblock address, which is information showing the position of the first macroblock of a slice. Alternatively, an area position may be coded in an area different from that of the video image coding data such as a UDP extended area, and the rearrangement may be performed based on the area position.

As described above, by transmitting a basic hierarchy area as basic hierarchical coding data and transmitting a supplementary hierarchy area as supplementary hierarchical coding data, the supplementary hierarchy area can be transmitted in a transmission rate period where there is a margin in a transmission rate while transmitting the basic hierarchy area in real time. By this, after supplementary hierarchical coding data is received, video image coding data can be reconstructed from basic hierarchical coding data and the supplementary hierarchical coding data, and a video image consisting of all areas can be viewed while viewing a basic hierarchy area in real time.

Third Embodiment

An explanation will be given in the following regarding a third embodiment. An explanation will be given mainly of differences from the second embodiment. There are two types of transmission structures in the third embodiment: basic hierarchical data (A) and supplementary hierarchical data (B). Basic hierarchical data is provided to the first transmission unit 102 as basic video image coding data, and supplementary hierarchical data is provided to the memory unit 103 as supplementary video image coding data.

The predictive transmission structure setting unit 100 sets a prediction structure and a transmission structure based on the transmission rate provided by the transmission rate acquisition unit 105 (S1001). An explanation will now be given regarding the setting of a transmission structure according to the third embodiment. Video image coding data is classified syntax-wise into a header, prediction information data, and prediction error data. Further, the prediction error data is classified into low frequency prediction error data and high frequency prediction error data. Low frequency prediction error data represents information regarding a direct-current component of orthogonal transformation, and high frequency prediction error data represents information regarding an alternating-current component of orthogonal transformation.

In a transmission rate period T1 (transmission rate R1) and a transmission rate period T4 (transmission rate R4), a header, prediction information data, and prediction error data are set to be basic hierarchical data. In a transmission rate period T2 (transmission rate R2), a header, prediction information data, and prediction error data are set to be basic hierarchical data, and high frequency prediction error data is set to be supplementary hierarchical data. In a transmission rate period T3 (transmission rate R3), a header and prediction information data are set to be basic hierarchical data, and prediction information data is set to be supplementary hierarchical data.

The video image coding unit 101 codes a video image that is input from the terminal 1 into basic hierarchical coding data and supplementary hierarchical coding data based on a transmission structure (S1003).

In the above, video image coding data is classified syntax-wise into a header, prediction information data, and prediction error data, and the header, the prediction information data, and the prediction error data are each set to be basic hierarchical data or supplementary hierarchical data. However, this is non-limiting. For example, inter prediction and orthogonal transformation are performed in a variable size in AVC or the like. Thus, setting to basic hierarchical data and supplementary hierarchical data can be performed based on a block size in the same way as, for example, setting a block having a predetermined block size or less to be basic hierarchical data and a block having the predetermined block size or larger to be supplementary hierarchical data (the basic hierarchical data and the supplementary hierarchical data may be switched for the setting). As a block size in this case, a block size for inter prediction may be selected when the quality of a video image to be transmitted is desired to be controlled based on the magnitude of motion in a video image, and a block size for orthogonal transformation may be selected when the quality of a video image to be transmitted is desired to be controlled based on the priority in the magnitude of a prediction error. This allows the proportion of basic hierarchical coding data to supplementary hierarchical coding data to be set flexibly according to the priority in the quality of a video image to be transmitted.

As described above, by transmitting a part of the syntax of video image coding data as basic hierarchical coding data and transmitting syntax for areas other than a basic hierarchy area as supplementary hierarchical coding data, the video image coding data can be reconstructed from the basic hierarchical coding data and the supplementary hierarchical coding data after the supplementary hierarchical coding data is received, and detailed information of a video image can be viewed, while viewing the basic information of the video image in real time.

[Exemplary Variation of Third Embodiment]

An explanation will be given in the following regarding an exemplary variation of the third embodiment. An explanation will be given regarding differences from the third embodiment. In the exemplary variation, the setting of a transmission structure is different from that of the third embodiment.

As a first exemplary variation, it is assumed that a luminance component Y represents basic hierarchical coding data and that a first color difference component Cb and a second color difference component Cr represent supplementary hierarchical coding data. As described above, by transmitting a luminance component as basic hierarchical coding data and transmitting a first color difference component and a second color difference component as supplementary hierarchical coding data, while viewing a monochrome video image in real time, video image coding data can be reconstructed from the basic hierarchical coding data and the supplementary hierarchical coding data after the supplementary hierarchical coding data is received so as to view a color video image.

Fourth Embodiment

An explanation will be given for a forth embodiment in the following mainly regarding differences from the first embodiment. FIG. 7 is a diagram explaining a video image coding data transmission and reception system according to the fourth embodiment. In FIG. 7, three monitoring cameras 1100, which represent an example of a video image coding data transmitter, are connected to a video image coding data relay device 1200 via a second network. Further, the video image coding data relay device 1200 is connected to the video image monitoring station 2000, which is an example of a video image coding data receiver, via a first network. An example of the second network is wireless LAN such as WiFi, and an example of the first network is LTE. The video image coding data relay device 1200 is installed, for example, inside a smartphone as an example of an LTE relay station.

(Configuration of Monitoring Camera 1100 and Configuration of Video Image Coding Data Relay Device 1200)

An explanation will be first given regarding the configuration of a monitoring camera 1000. A monitoring camera 1000 is provided with a video image coding unit 101 and a third transmission unit 107.

Based on a transmission structure and a prediction structure set by a predictive transmission structure setting unit 122 of a video image coding data relay device 1200, the video image coding unit 101 codes a video image that is input from a terminal 1 and generates basic video image coding data that corresponds to a basic hierarchy and supplementary video image coding data that corresponds to a supplementary hierarchy. The video image coding unit 101 provides a video image stream containing the basic video image coding data and the supplementary video image coding data to the third transmission unit 107.

The third transmission unit 107 transmits the video image stream provided from the video image coding unit 101 to the video image coding data relay device 1200 via the second network.

An explanation will now be given regarding the configuration of a video image coding data relay device 1200. A video image coding data relay device 1200 is provided with a second receiving unit 120, a video image coding data analysis unit 121, a predictive transmission structure setting unit 122, a first transmission unit 102, a memory unit 103, a second transmission unit 104, a transmission rate acquisition unit 105, and a transmission control unit 106.

The transmission rate acquisition unit 105 acquires the transmission rate of a first network and provides the acquired transmission rate to the transmission control unit 106 and the predictive transmission structure setting unit 122.

The predictive transmission structure setting unit 122 sets the transmission structure of a video image based on the transmission rate provided from the transmission rate acquisition unit 105 and also sets a prediction structure that indicates a reference relationship of each picture of the video image.

The second receiving unit 120 receives a video image stream from a monitoring camera 1100 and provides the video image stream to the video image coding data analysis unit 121.

Based on the transmission structure and the prediction structure set by the predictive transmission structure setting unit 122, the video image coding data analysis unit 121 separates and extracts basic video image coding data and supplementary video image coding data from a video image stream, provides the basic video image coding data to the first transmission unit, and stores the supplementary video image coding data in the memory unit 103. In the above, the basic video image coding data and the supplementary video image coding data are separated from the video image stream based on the transmission structure and the prediction structure. Alternatively, the basic video image coding data and the supplementary video image coding data can be respectively assigned with different identifiers in advance and separated.

The first transmission unit 102 transmits the basic video image coding data provided from the video image coding data analysis unit 121 to the video image monitoring station 2000 via the first network.

Based on the transmission rate provided from the transmission rate acquisition unit 105, the transmission control unit 106 controls the transmission of the supplementary video image coding data stored in the memory unit 103.

When the transmission control unit 106 issues an instruction for transmitting the supplementary video image coding data based on the transmission rate, the second transmission unit 104 reads out the supplementary video image coding data stored in the memory unit 103 and transmits the supplementary video image coding data to the video image monitoring station 2000 via the first network.

In the fourth embodiment, although the video image coding data relay device 1200 does not perform a process of coding a video image since the video image coding data relay device 1200 receives video image coding data already coded by the monitoring camera 1100, the video image coding data relay device 1200 performs the same process as in the monitoring camera 1100 according to the first embodiment for the transmission of video image data after coding. The configuration and operation of the video image monitoring station 2000 are the same as those in the first embodiment.

The video image coding data relay device 1200 is realized by the cooperation of hardware and software in an information processing device or the like provided with a CPU (Central Processing Unit), a frame memory, a hard disk, and the like. By the operation of the above constituting elements, the video image coding data relay device 1200 achieves functional constituting elements explained in the following.

(Overview of Operation of Monitoring Camera 1100)

An explanation will now be given regarding the overview of the operation of the monitoring camera 1100. The prediction structure and the transmission structure received from the second network are provided to the video image coding unit 101. The video image coding unit 101 generates video image coding data based on the prediction structure and the transmission structure that are received and provides the video image coding data to the third transmission unit 107. The third transmission unit 107 transmits the video image coding data provided from the video image coding unit 101 to the second network in real time.

(Overview of Operation of Video Image Coding Data Relay Device 1200)

An explanation will now be given regarding the overview of the operation of the video image coding data relay device 1200.

The predictive transmission structure setting unit 122 sets a prediction structure and a transmission structure based on the transmission rate provided by the transmission rate acquisition unit 105. The prediction structure and the transmission structure that are set are provided to the video image coding unit 101 via the second network. It is assumed that the setting of the prediction structure and the transmission structure is performed based on, for example, a specification such as Open Network Video Interface Forum (ONVIF). Further, the prediction structure and the transmission structure that are set are also provided to the video image coding data analysis unit 121. On the other hand, the second receiving unit 120 receives the video image coding data transmitted from the third transmission unit 107 via the second network.

Based on the prediction structure and the transmission structure provided by the predictive transmission structure setting unit 122, the video image coding data analysis unit 121 separates the video image coding data input from the second receiving unit 120 into basic video image coding data and supplementary video image coding data, provides the basic video image coding data to the first transmission unit 102, and provides the supplementary video image coding data to the memory unit 103. A process of transmitting the basic video image coding data and the supplementary video image coding data that follows after this is the same as that in the first embodiment. The basic video image coding data is transmitted to the video image monitoring station 2000 in real time via the first network, and the supplementary video image coding data is transmitted to the video image monitoring station 2000 via the first network when there is a margin in the transmission rate of the first network.

As described above, in the fourth embodiment, by using a smartphone or the like that has a transmission and reception function as a video image coding data relay device in advance, it is no longer necessary to add a function of distinguishing a basic hierarchy from a supplementary hierarchy and transmitting the basic hierarchy from the supplementary hierarchy to a monitoring camera. Thus, a conventional function of a monitoring camera system can be easily expanded.

The processes described in the above embodiments can obviously be implemented by hardware-based apparatus for transmission, storage, or reception. Alternatively, the processes can be implemented by firmware stored in a read-only memory (ROM), a flash memory, etc., or by software on a computer, etc. The firmware program or the software program may be made available on, for example, a computer readable recording medium. Alternatively, the programs may be made available from a server via a wired or wireless network. Still alternatively, the programs may be made available in the form of data transmission over terrestrial or satellite digital broadcast systems.

Described above is an explanation of the present invention based on the embodiments. The embodiments are intended to be illustrative only, and it will be obvious to those skilled in the art that various modifications to constituting elements and processes could be developed and that such modifications are also within the scope of the present invention.

What is claimed is:

1. A video image coding data receiver comprising:
 a processor; and
 a memory unit having instructions stored which, when executed by the processor, cause the processor to perform operations comprising:
 receiving basic video image coding data;
 decoding the received basic video image coding data so as to reproduce a video image;
 receiving supplementary video image coding data including a supplementary hierarchical picture whose coding order and display order are earlier by a factor of a group of pictures including an intra coded picture and a plurality of inter prediction coded pictures than those of a basic hierarchical picture included in the basic video image coding data, a basic hierarchy and a supplementary hierarchy being set in units of the group of pictures;
 acquiring basic video image coding data received before supplementary video image coding data that has been received at the moment; and
 reconstructing video image coding data from the basic video image coding data and the supplementary video image coding data.

2. A video image coding data transmission and reception system comprising:
 a video image coding data transmitter that codes and transmits a video image; and
 a video image coding data receiver that receives and reconstructs video image coding data,
 wherein the video image coding data transmitter includes:

a first processor; and a first memory unit having instructions stored which, when executed by the first processor, cause the first processor to perform operations comprising:

acquiring the transmission rate of a network;

setting a transmission structure including a basic hierarchy and a supplementary hierarchy, the basic hierarchy and the supplementary hierarchy being set in units of a group of pictures including an intra coded picture and a plurality of inter prediction coded pictures;

transmitting basic video image coding data of the basic hierarchy, wherein the first memory unit is further configured to store supplementary video image coding data of the supplementary hierarchy;

transmitting the supplementary video image coding data stored in the memory unit; and controlling the transmission of the supplementary video image coding data according to the transmission rate, and wherein the video image coding data receiver includes:

a second processor; and a second memory unit having instructions stored which, when executed by the second processor, cause the second processor to perform operations comprising:

receiving the basic video image coding data;

decoding the received basic video image coding data so as to reproduce a video image;

receiving the supplementary video image coding data including a supplementary hierarchical picture having coding order and display order that are earlier by a factor of the group of pictures than those of a basic hierarchical picture included in the basic video image coding data;

acquiring basic video image coding data received before supplementary video image coding data that is currently received; and reconstructing video image coding data from the basic video image coding data and the supplementary video image coding data.

* * * * *